United States Patent [19]
McEwan

[11] Patent Number: 6,137,438
[45] Date of Patent: Oct. 24, 2000

[54] PRECISION SHORT-RANGE PULSE-ECHO SYSTEMS WITH AUTOMATIC PULSE DETECTORS

[75] Inventor: Thomas E. McEwan, 1734 Cairo St., Livermore, Calif. 94550

[73] Assignee: Thomas E. McEwan, Carmel Highlands, Calif.

[21] Appl. No.: 09/120,994

[22] Filed: Jul. 22, 1998

[51] Int. Cl.[7] .............................. G01S 13/08; G01S 7/28
[52] U.S. Cl. ...................... 342/134; 342/70; 342/118; 342/120; 342/123; 342/124; 342/135; 356/5.01; 367/87; 367/99
[58] Field of Search ............................ 342/118, 120, 342/122, 123, 124, 125, 127, 128, 130, 131, 132, 134, 135, 136, 145, 70, 71, 72; 356/5.01, 5.1, 5.13; 367/87, 99, 101

[56] References Cited

U.S. PATENT DOCUMENTS

| | | |
|---|---|---|
| 3,676,783 | 7/1972 | Kinbara et al. . |
| 3,818,757 | 6/1974 | Brown . |
| 4,022,058 | 5/1977 | Brown . |
| 4,023,171 | 5/1977 | Stavis ................................. 342/120 X |
| 4,179,664 | 12/1979 | Bedwell . |
| 4,403,857 | 9/1983 | Holscher ............................... 356/5.13 |
| 4,507,795 | 3/1985 | Wagner . |
| 5,309,161 | 5/1994 | Urkowitz et al. ....................... 342/132 |
| 5,612,779 | 3/1997 | Dunne ...................................... 356/5.01 |
| 5,686,921 | 11/1997 | Okada et al. ........................... 342/127 |
| 5,701,296 | 12/1997 | Yamauchi . |
| 5,880,821 | 3/1999 | Dunne .................................. 342/135 X |

FOREIGN PATENT DOCUMENTS

WO91/13370 5/1991 WIPO .............................. G01S 13/04

*Primary Examiner*—Bernarr E. Gregory
*Attorney, Agent, or Firm*—Mark A. Haynes; Haynes & Beffel LLP

[57] ABSTRACT

An equivalent time pulse-echo radar or other pulse-echo system employs a transmit reference sampler collocated with the transmitter to provide a transmit reference pulse, which initiates a pulse width modulated (PWM) pulse. A receive sampler connected to a receive antenna provides an echo-detection pulse that terminates the PWM pulse, such that the width of the PWM pulse indicates target range. The transmit reference sampler and the receive sampler are driven from a common clock such that transmit-receive timing offset drift precisely cancels on a picosecond scale, thereby enabling sub-mm range accuracy with common, low-cost circuit elements. The radar further includes automatically referenced pulse detectors that are responsive to either the magnitude or the phase of the sampler outputs. The radar can be used for precision tank level measurements, robotics, or automotive ranging applications.

25 Claims, 5 Drawing Sheets

PRECISION SHORT-RANGE PULSE-ECHO SYSTEMS WITH AUTOMATIC PULSE DETECTORS

BACKGROUND OF THE INVENTION

1. Field of the Invention

The present invention relates to pulse-echo ranging systems, and more particularly to radar or laser rangefinders and time domain reflectometers with precision timing.

2. Description of Related Art

High range resolution pulse-echo systems such as wideband pulsed radars, pulsed laser rangefinders, and time domain reflectometers often sweep a timing circuit across a range of delays. The timing circuit controls a receiver sampling gate such that when an echo signal coincides with the temporal location of the sampling gate, a sampled echo signal is obtained. The range of the sampled echo is directly determined from the timing circuit, so highly accurate timing is needed to obtain high accuracy range information.

Precision timing circuits having scale factor accuracies on the order of several tens of picoseconds or better can be realized with a Delay Locked Loop (DLL) such as a "Precision Digital Pulse Phase Generator" as disclosed by McEwan in U.S. Pat. No. 5,563,605, or in copending application, "Phase-Comparator-Less Delay Locked Loop", Ser. No. 09/084,541, by McEwan now U.S. Pat. No. 6,055,287. Alternatively, dual crystal clocks, one for transmit and one for receive, can be employed, where the receive clock is locked to a small offset frequency from the transmit clock, such as 100 Hz, thereby causing a steady phase slip of one complete clock cycle 100 times per second. In the process, the receive sampler timing smoothly sweeps across one complete pulse repetition interval every 10 ms.

While a high degree of scale factor stability and linearity can be achieved with these techniques, timing offsets are difficult to control on the picosecond level since the propagation delay of every element in the transmit and receive path can contribute several hundred picoseconds of temperature dependent error. Thus, it is essentially impossible to obtain a timing accuracy and stability of less than 6.6 picoseconds as needed for sub-mm ranging accuracy.

Prior art methods to address timing offsets include providing a reference reflector close to the radar antenna, so the radar measures the difference between the reference reflection and the target reflection. This differencing process subtracts out the fixed timing offsets in the radar, leaving the range measurement solely dependent on, in principal, the scale factor accuracy of the timing circuit. This technique has been exploited in a time-domain-reflectometer (TDR) "Electronic Multi-purpose Material Level Sensor", U.S. Pat. No. 5,610,611 by McEwan, wherein a "dipstick" launching plate is used as the reference reflector.

The problems with a reference reflector are twofold: 1) a reflector must be added to the radar "scene", which can be very inconvenient, and 2) reflections from the reference reflector sum with target returns whenever the target is close to the reference reflector, thereby creating an erroneous displaced target echo.

A means is needed to obtain an extremely low drift transmit reference sample relative to the received echo sample without placing a reflector in the field.

SUMMARY OF THE INVENTION

The invention is a precision radar rangefinder employing equivalent time sampling and automatic pulse detectors responsive to either pulse carrier magnitude or pulse carrier phase. The invention can be used to measure the liquid level in a tank with 1 mm accuracy, for example. While illustrated with reference to a radar rangefinder, the invention also encompasses other pulse-echo systems, including laser rangefinders and time domain reflectometers.

The present invention significantly advances the accuracy and simplicity of high resolution pulse-echo radar rangefinders by collocating a transmit reference sampler with the transmit antenna to provide a sampled transmit reference pulse. This pulse initiates a range measurement, and the received echo is sampled to obtain a receive pulse that terminates the range measurement, thereby producing range measurement related to the difference between the sampled transmit reference pulse and the sampled receive echo.

Extremely high timing stability is realized by driving the transmit reference sampler and the receive sampler from a common clock, thereby eliminating timing skew and drift. By their broadband passive nature, the samplers introduce essentially no timing drift, so only the sampling gate timing needs to be controlled. In this invention, the possibility of sampling gate timing drift is eliminated by deriving the timing from a common tie point.

The invention further provides automatic threshold detectors to eliminate threshold detection errors resulting from pulse amplitude variations. The automatic threshold detectors can be set to trigger on the sampled pulse carrier magnitude or on the sampled pulse carrier phase.

Experiments indicate that carrier phase detection results in about 10 times higher range accuracy in the presence of radar clutter, compared to envelope detection. This is particularly important for close-in range measurements where the most dominant form of clutter is ringing and main bang coupling from the radar antenna. The reason carrier magnitude detection provides lower accuracy is that the envelope of the radar pulse has a slower risetime than the underlying sinusoids, and summing-in a small error signal such as radar clutter will produce a proportionately larger displacement in detection time.

A primary object of the present invention is to provide a precision radar timing arrangement with a typical accuracy of 6-ps or better. In a rangefinder application, the range accuracy provided by the present invention is on the order of 1 mm or better, as limited by timing circuit scale factor errors.

Another object of the present invention is to provide an implementation with a minimum of components to facilitate widespread use in low-cost commercial and consumer rangefinding applications. Since the present invention is comprised of simple CMOS logic gates and operational amplifiers, it is a model of simplicity.

The present invention can be used in low cost radars for tank level measurements, including custody transfer measurements, industrial and robotic controls, vehicle backup warning and collision radars, and general rangefinding applications.

In another embodiment utilizing the present invention, a time domain reflectometer where an impulse is propagated along a conductor or guidewire can be realized for use in a variety of applications, such as an "electronic dipstick" for fluid level sensing.

DETAILED DESCRIPTION OF THE INVENTION

A detailed description of the present invention is provided below with reference to the figures. While illustrative component values and circuit parameters are given, other embodiments can be constructed with other component values and circuit parameters. All U.S. Patents and copending U.S. applications cited herein are herein incorporated by reference.

Figure 1:
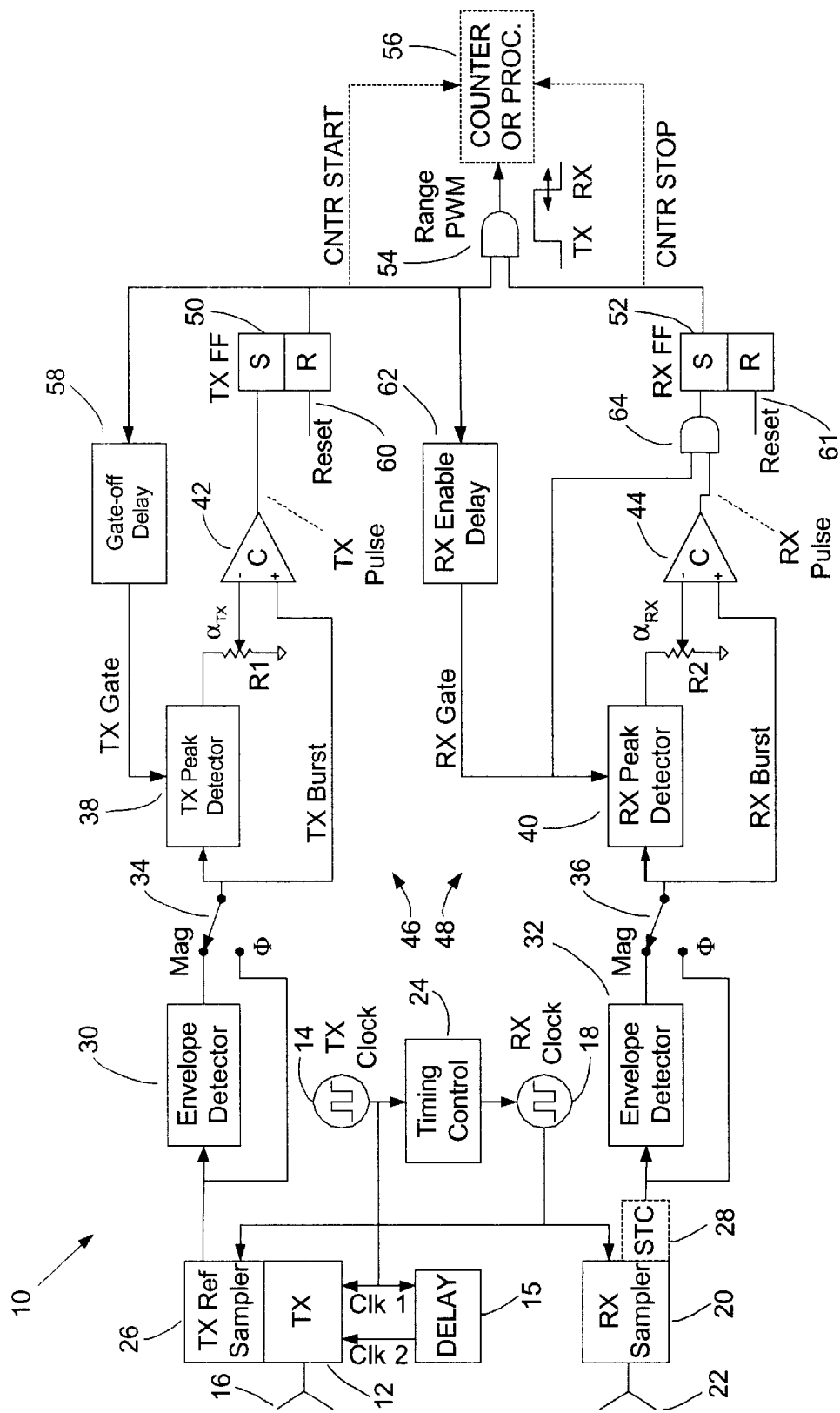
FIG. 1 is a block diagram of the present invention.

FIG. 1 is a block diagram of a radar rangefinder 10 of the present invention. A transmitter (TX) 12 receives clock pulses from TX clock 14 and produces RF burst pulses (transmit pulses) at the transmit antenna 16. TX Clock 14 produces two clock pulses, Clk1 which is the direct output of TX Clock 14, and Clk2 which is produced by passing Clk1 through a delay circuit 15. The RF pulses are typically 6 cycles long at a carrier frequency of 5.8 GHz.

A receive (RX) clock 18 drives an RX sampler 20 to sample radar returns on its associated receive antenna 22. The RX clock 18 is typically swept in time relative to the TX clock 14. This function is performed by the timing control unit 24 connected between TX clock 14 and RX clock 18. Alternatively the TX clock is a first quartz crystal clock, and the RX clock is a second quartz crystal clock that is phase locked to a typical offset of 100 Hz from the TX clock, such that the phase of the RX clock slips one full pulse repetition interval (PRI) every 10 ms. In this case timing control unit 24 performs the phase-lock function. In either case, an equivalent time (ET) replica of the RF signal produced by TX 12 appears at the sampler 20 output. The ET replica exactly resembles the RF signal, except it occurs on a slow time scale such as 10 ms, and has an ET PRI on the order of 10 ms. In addition the ET replica is considerably amplified compared to its RF counterpart.

The TX circuit 12 and TX antenna 16 also have, collocated, a transmit reference (TX Ref) sampler 26 that produces an ET replica of the transmit pulse. Both this transmit pulse and the RX sampler output pulse, i.e., the radar return pulse or pulse-echo, generally consist of a burst of 6 cycles of RF having a carrier frequency at 5.8 GHz and a duration of 1-nanosecond. The receive sampler output may also be passed through a sensitivity time control (STC) 28, as is well-known in the art, to increase the receiver gain as the sampler operates further out in radar range.

Figure 5:
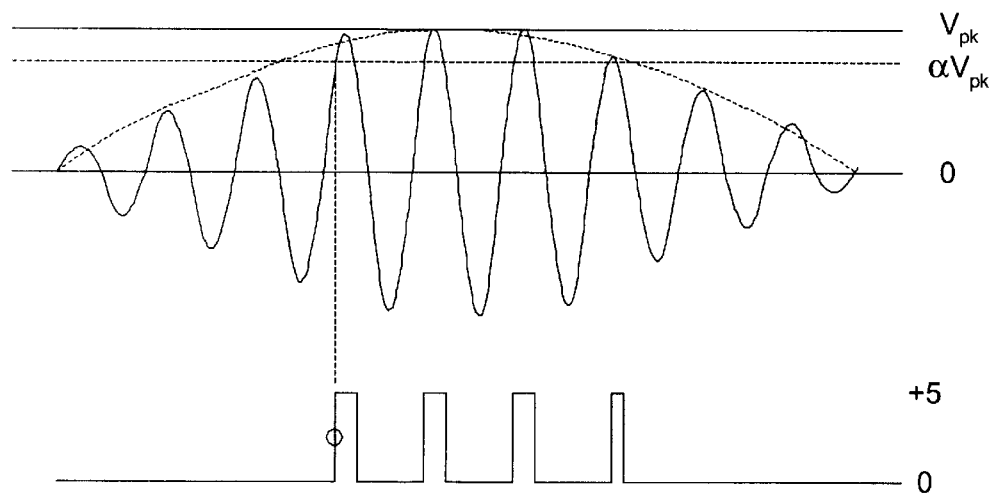
FIG. 5 depicts waveforms involved in equivalent time carrier phase detection according to the present invention.

The TX Ref and RX ET burst signals are envelope detected by respective envelope detectors 30, 32. The envelope of a sinusoidal burst is shown in FIG. 5. The envelope-detected signals are referred to as magnitude (MAG) signals, and the raw ET sinusoidal burst signals are referred to as phase ($\Phi$) signals.

Either of the MAG or $\Phi$ signals may be selected by a switch 34, 36 and applied to their respective TX and RX peak detectors 38, 40 and comparators 42, 44, which form automatic threshold detectors 46, 48, as will be described below with respect to FIG. 4. The MAG output signals of envelope detectors 30, 32 or the $\Phi$ output signals of TX Ref sampler 26 or RX sampler 20, as selected by switches 34, 36 are applied to the positive (+) inputs of comparators 42, 44 respectively. The MAG or $\Phi$ signals are also input into TX and RX peak detectors 38, 40. The outputs of TX and RX peak detectors 38, 40 are connected to ground through a variable resistor (potentiometer) R1 and R2 respectively. The pickoffs or potentiometer arms of R1 and R2 are connected to the negative (−) inputs of comparators 42, 44 respectively so that an adjustable fraction, $\alpha_{TX}$, $\alpha_{RX}$ of the output signals from peak detectors 38, 40 are applied to comparators 42, 44. The outputs of the comparators 42, 44 toggle TX and RX flip-flops (TX FF) 50 and (RX FF) 52, respectively. (The output of comparator 44 is gated through AND gate 64, as described below, before being input into RX FF 52.) The TX and RX FFs are conventional set-reset flipflops comprised of cross-coupled NAND gates. The outputs of the TX and RX FF's 50, 52 are combined in an AND gate 54 to form a pulse width modulation (PWM) pulse having a width proportional to radar target range. The PWM pulse can be used to gate a simple digital counter 56 to determine range. It may also be averaged to produce a voltage proportional to range. Unit 56 thus generally represents any further signal processing unit. Other common techniques known to those skilled in digital techniques can also be used, such as using the TX and RX flip-flop outputs to directly control a start-stop counter, as represented by dashed lines from TX FF 50 and RX FF 52 to counter 56.

Figure 6:
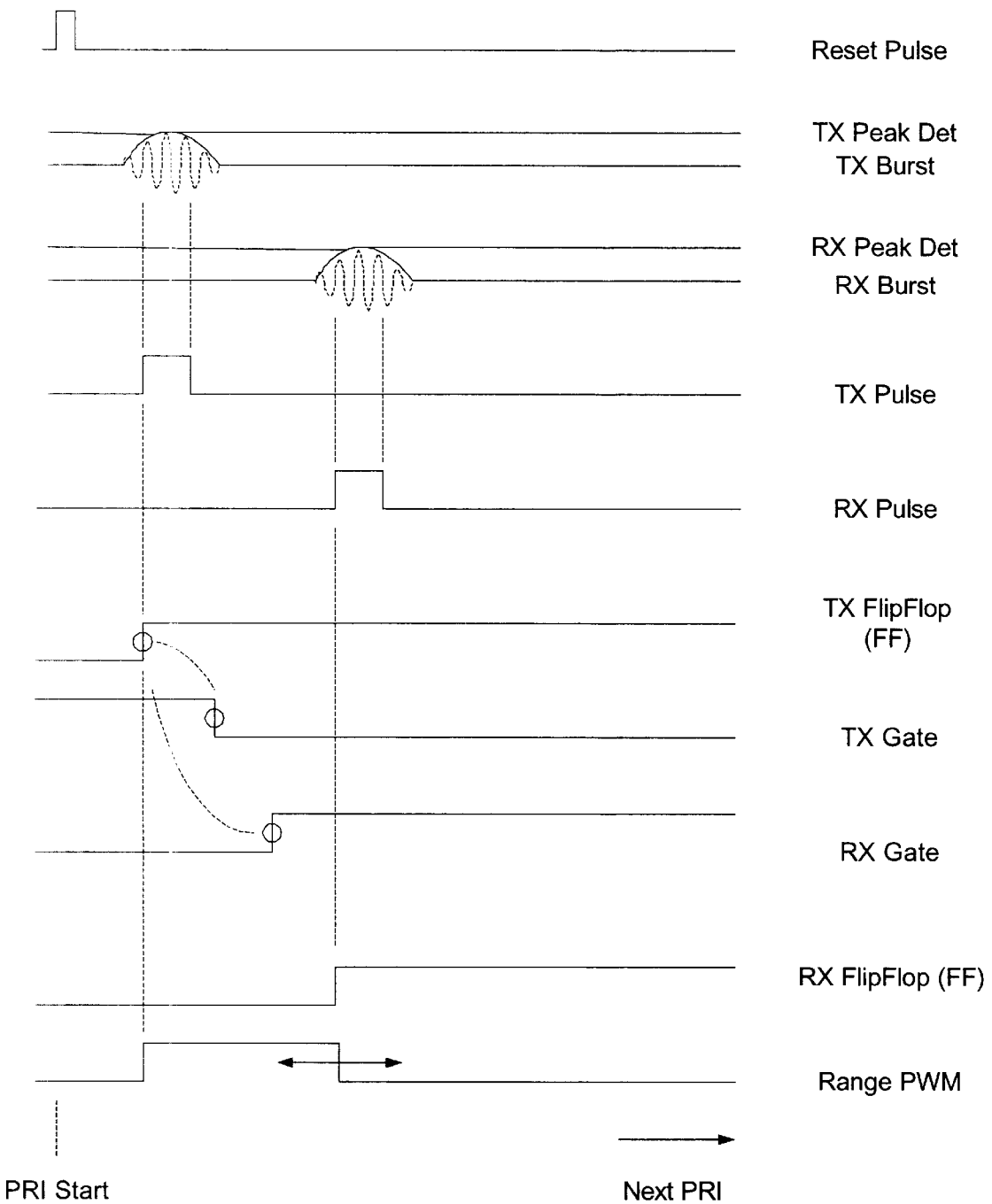
FIG. 6 shows the timing relations associated with FIG. 1.

The TX peak detector 38 receives a delayed gate-off pulse from Gate-Off Delay Generator 58 whose input is connected to the output of TX FF 50. The gate-off delay pulse is timed to inhibit the TX peak detector 38 a short time after it detects the first ET pulse following a reset pulse applied to the reset input 60 of TX FF 50 (and also to reset input 61 of RX FF 52), as seen in FIG. 6. This delay is necessary to allow the TX peak detector 38 time to detect the peak amplitude of the ET pulse that triggers the TX flip-flop 50.

The RX peak detector 40 has an RX Enable Delay Generator 62 in its RX Gate path. The input of RX enable delay generator 62 is also connected to the output of TX FF 50. Delay generator 62 applies an enable delay pulse to RX peak detector 40. The enable delay pulse from delay generator 62 is also applied to one input of AND gate 64 whose other input is connected to the output of comparator 44, and whose output is connected to the input of RX FF 52. Thus the enable signal from delay generator 62 enables both RX peak detector 40 and the input of RX FF 52. This delay is initiated by a TX pulse detection, and provides a minimum TX-to-RX detection interval, or dead-time. This interval is needed to prevent the RX Peak Detector 40 from operating on the TX main-bang pulse that may be present at the RX Sampler 20, depending on TX-RX antenna isolation. Suitable high isolation antennas to reduce or eliminate main bang coupling are disclosed in co-pending application, "Broadband Antenna Pair with Low Mutual Coupling", Ser. No. 09/090,029, by McEwan now U.S. Pat. No. 6,031,504. The function of the Receive Peak Detector 40 and Comparator 44 is to detect the largest amplitude ET pulse issuing from the RX Sampler 20 after the RX Enable occurs. Under virtually all circumstances this is the first, and largest, radar return pulse or echo.

The net effect of the system depicted in FIG. 1 is to provide fool-proof TX and RX pulse detection logic with automatic threshold tracking to eliminate pulse amplitude variations, and to provide a picosecond stable pulse detection scheme. Further, the ET pulse carrier phase can be detected for increased accuracy.

Figure 2:
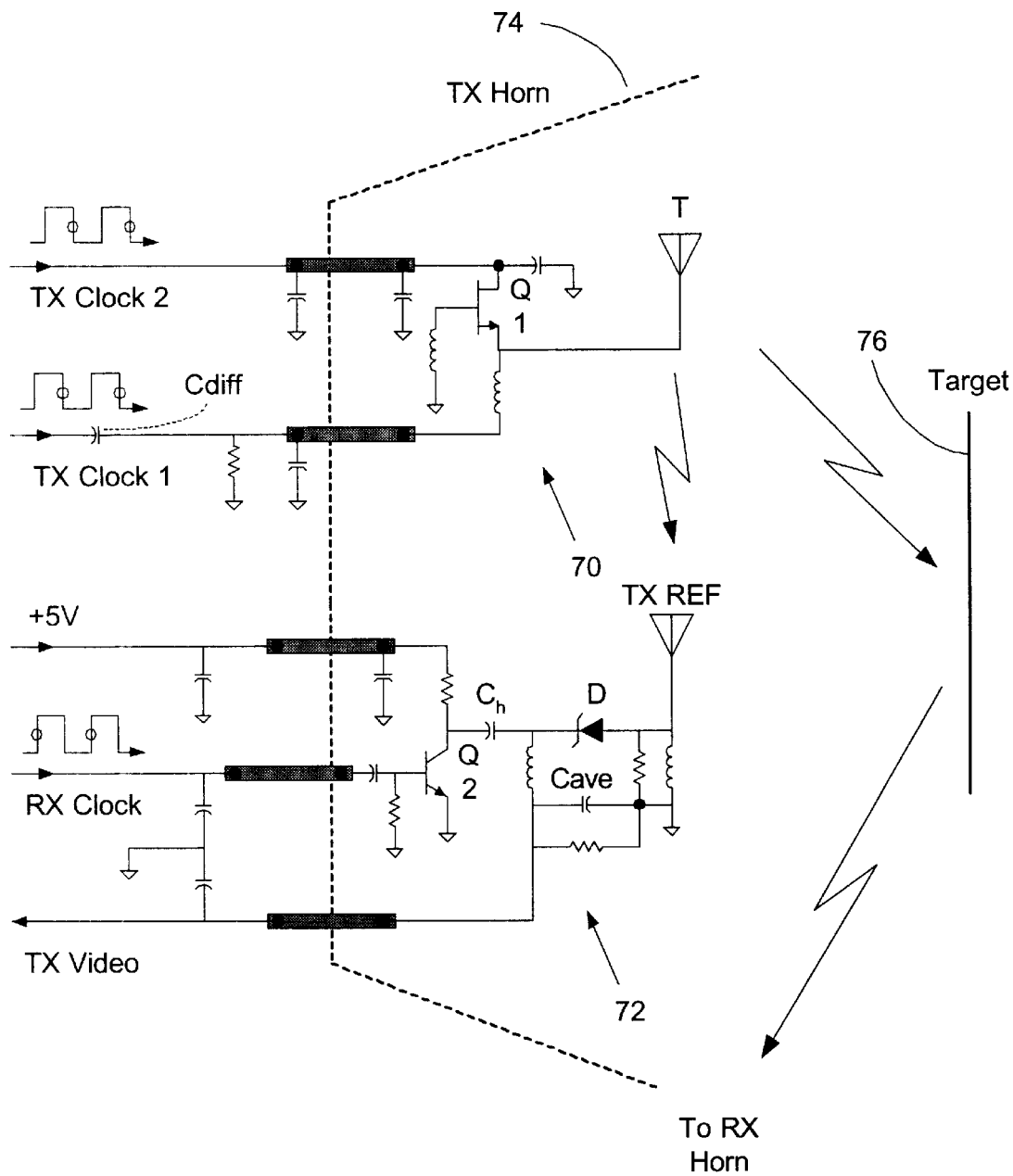
FIG. 2 is a detailed schematic of an exemplary transmitter and transmit reference sampler of the present invention.

FIG. 2 is a detailed schematic of a transmitter circuit 70 and transmit reference sampler circuit 72 of the present invention; these are particular embodiments of TX 12 and TX Ref sampler 26 of FIG. 1. A horn 74 is shown containing the two separate circuits 70, 72, both of which generally reside within the horn itself. In alternative embodiments, only the antennas labeled T and TX Ref would reside within the horn 74. The preferred mode is to keep all the RF circuitry within the horn since the horn provides shielding and prevents stray radiation from coupling into or from the circuitry. Shielding the transmit circuitry is particularly necessary to achieve low sidelobe and backlobe levels for the entire assembly.

Transmitter 70 is a GaAsFET oscillator Q1, set to operate, for example, in the 5.8 GHz ISM band. The oscillator is driven by a TX Clock 1 signal, which turns-on the oscillator at the negative clock transitions, due to the differentiation effect of the coupling capacitor $C_{diff}$ in series with this line. Shortly after the oscillator turns on, a TX Clock 2 signal (which is a delayed Clock 1 signal) goes low, eliminating the source of DC power for the GaAsFET and quickly quenching oscillations. This differential drive scheme produces extremely stable and narrow RF pulse bursts, typically consisting of about 6 cycles of RF at 5.8 GHz, or about 1-ns envelope width. This circuit has been described in co-pending application, "Pulsed RF Oscillator and Radar Motion Sensor", Ser. No. 09/073,159, by McEwan. The RF pulse bursts are transmitted from transmit antenna T connected to Q1 toward a target 76 and also toward transmit reference antenna TX Ref.

Figure 3:
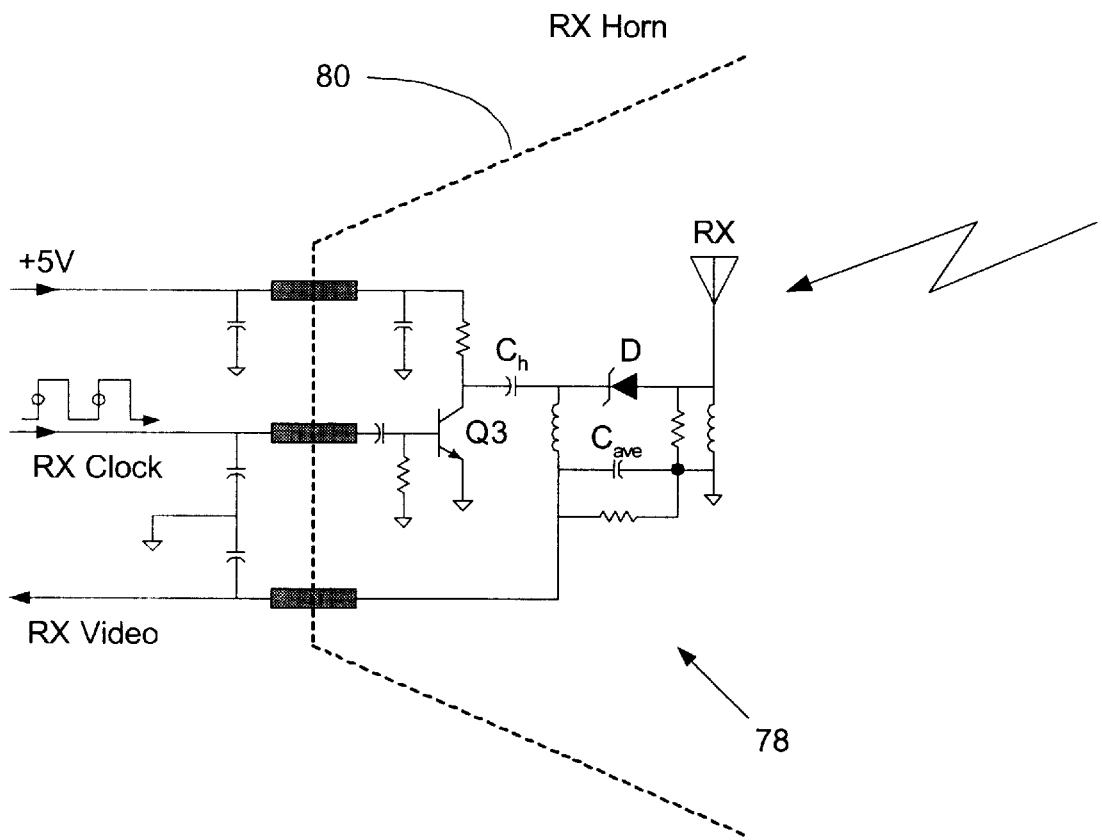
FIG. 3 is a detailed schematic of an exemplary receive sampler of the present invention.

Also included within the horn 74 is a transmit reference sampler circuit 72 which is identical to the receive sampler 78 shown in FIG. 3, and has been described in co-pending application, "Charge Transfer Wideband Sample-Hold Circuit", Ser. No. 09/084,502, by McEwan. Operation of sampler 72 is as follows: a squarewave clock signal RX Clock causes a bipolar transistor Q2 to rapidly switch on at the positive edge of the clock pulse. As a result, the collector of the bipolar transistor swings negative in less than 7.0 ps, creating a current flow through a charge-holding capacitor Ch and driving Schottky diode D into conduction. Capacitor Ch is connected from the collector of Q2 to the cathode of D, whose anode is connected to antenna TX Ref. As D conducts, it causes Ch to charge to the sum of the drive pulse and the input pulse from the TX Ref antenna. After conduction, the charge on Ch transfers, through voltage equilibrium, to a larger capacitor, $C_{ave}$. Thus gating is accomplished through the simple addition of a fast local pulse from Q2 and the input signal from the antenna, such that D is driven into conduction only during the current pulse interval. In the general case where the signal from the antenna is comprised of RF sinusoids, the current pulse flowing through Ch should have a duration of about ½ cycle of the RF sinusoid.

In an A-scan type pulse-echo rangefinder, such as the present invention, the receive clock is swept in time relative to the transmit clock, and a varying voltage appears across $C_{ave}$, depending on signals present at antenna TX Ref. Since the TX Ref antenna is in very close proximity to the transmit antenna T, the only practical signal seen at the sampler output, on the TX Video line, is an equivalent time replica of the transmit pulse. Any radar reflections from objects external to the horn are very weak in comparison to the transmit RF burst. Thus the TX Video line contains a clean equivalent time replica of the transmit signal suitable for a precision transmit timing reference.

FIG. 3 shows a receive sampler circuit 78 located inside a receive horn 80. As with the transmit horn 74, only the antenna monopole RX need be situated inside the horn, but locating all the receive RF circuitry inside the horn is preferred for the same reasons as cited above for the transmit circuitry. The RX Clock signal for this circuit is obtained from the exact same circuit node that supplies the RX Clock to the TX Ref Sampler 72 of FIG. 2. Thus, exact sample timing is established between these two samplers, with the possible exception of propagation time skewing between Q2 and Q3. However, Q2 and Q3 are preferably bipolar transistors with a cutoff frequency $F_t$=11 GHz or more, with an emitter-base time constant $\tau_{eb}=1/(2\pi F_t)=15$, and thus introduce a very small time constant and correspondingly low propagation delay variation. Tests show that a 70° C. temperature change on one transistor alone results in only a few picoseconds propagation delay variation. Since both Q2 and Q3 normally operate at the same temperature, they can be expected to track on the 1-picosecond level.

Figure 4:
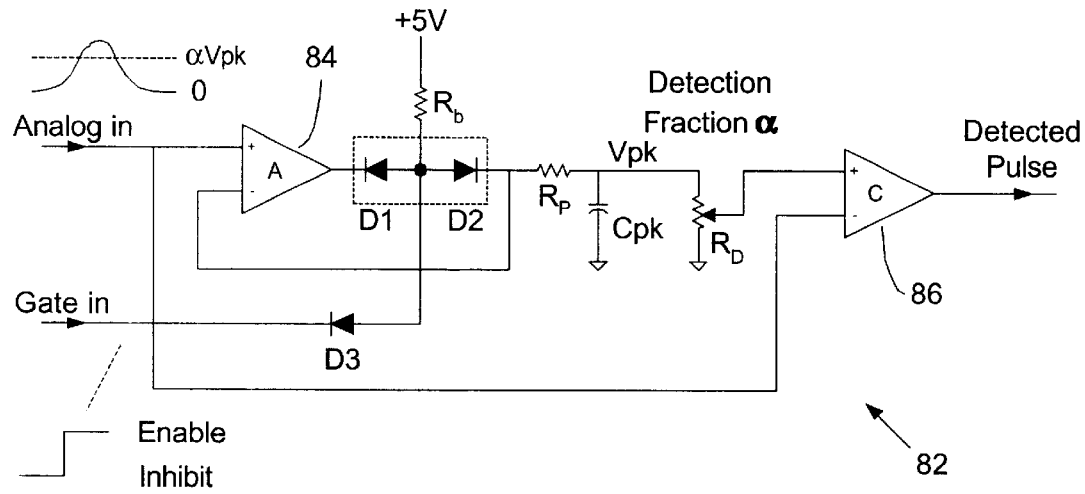
FIG. 4 is a detailed schematic of an exemplary gated peak detector of the present invention.

FIG. 4 depicts an automatic threshold detector 82 of the present invention; detector 82 is a particular embodiment of automatic threshold detectors 46, 48 of FIG. 1. This circuit, in general form is commonly known as a constant fraction discriminator (CFD). The CFD circuit 82 receives an input pulse, on the Analog In line, as seen in FIG. 4, or as seen in FIG. 5 as either an expansion of the pulse in FIG. 4, which represents a burst envelope pulse, or a sinusoidal burst as seen in FIG. 5, in equivalent time. In either case, the input pulse is connected to a peak-detector configured op amp (A) 84, where capacitor $C_{pk}$ is charged to the peak voltage of the input pulse through series diodes D1, D2 which are connected together at their anodes. The cathode of D1 is connected to the output of A, the anodes of D1, D2 are connected through resistor $R_b$ to a +5V supply, and the cathode of D2 is connected through resistor $R_p$ to $C_{pk}$ which is connected to ground. Once the peak has passed, the op amp output swings low, cutting off the diodes and leaving a peak voltage $V_{pk}$ on $C_{pk}$. Resistor $R_p$ is a phase lead compensation resistor that prevents the circuit from operating erratically or from overshooting the true peak of the input pulse.

Voltage $V_{pk}$, as seen in FIG. 5, is multiplied by a constant $\alpha$ with a potentiometer $R_D$ (which corresponds to R1, R2 in FIG. 1) to produce a reduced amplitude voltage $\alpha V_{pk}$, which is applied to a comparator (C) 86 (which corresponds to comparators 42, 44 in FIG. 1). The pulse on the Analog in line is also routed directly to the comparator 86, and when the amplitude of this pulse reaches $\alpha V_{pk}$, the comparator output produces a detection indication, as shown in the lower waveform of FIG. 5.

Clearly if the peak value of the input pulse changes, $\alpha V_{pk}$ also changes proportionally so the trigger point on the input pulse remains the same, i.e., amplitude independent. It should be noted that this circuit only works for repetitive waveforms, where $C_{pk}$ can be charged to the peak value of the previous repetition.

This circuit also performs the difficult task of detecting the carrier phase. To perform this function, constant $\alpha$ is adjusted via the Detection Fraction potentiometer $R_D$ to produce voltage $\alpha V_{pk}$ that is situated at a reliable trigger point on a lobe of the sinusoidal burst. That is, the trigger point is best set equidistant from the adjacent lobes, as depicted in FIG. 5. Note that if the burst changes amplitude, the trigger point $\alpha V_{pk}$ will track proportionally. Thus reliable carrier phase detection is obtained with this simple circuit.

The circuit of FIG. 4 also features a gate input, which is effected through a diode D3 having its anode connected to the anodes of the peak detector diodes D1, D2. When the Gate in line is low (Inhibit), the gate diode D3 prevents the common diode tie point from going high and charging capacitor $C_{pk}$. When the Gate in line is high (Enable), the gate diode D3 is effectively removed from the circuit.

FIG. 6 shows the sequence of pulses at various points in the circuit of FIG. 1. The reset pulse applied to FFs 50, 52 initiates the operation. Shortly thereafter in equivalent time the TX and RX burst signals from the TX Ref sampler 26 and the RX sampler 20 appear, and the corresponding TX and RX peak values peak detectors 38, 40. The TX pulse and the RX pulse are the outputs of comparators 42, 44, and they toggle the TX FF and RX FF respectively. The TX flipflop signal which is the output of TX FF 50 initiates the TX gate signal from Gate-Off Delay Generator 58, after a delay as indicated by the dashed line in FIG. 6. It also initiates RX gate signal from RX enable delay generator 62, after a delay as indicated by a second dashed line in FIG. 6. The RX flipflop signal is the output of RX FF 52 when triggered by the RX signal after being enabled by the RX gate signal. The TX FF and the RX FF signals produce the equivalent time range PWM output pulse.

Changes and modifications in the specifically described embodiments can be carried out without departing from the scope of the invention which is intended to be limited only by the scope of the appended claims.

What is claimed is:

1. A precision pulse-echo ranging apparatus comprising:
   a transmit antenna;
   a transmitter connected to the transmit antenna;
   a transmit reference antenna collocated with the transmit antenna;
   a transmit reference equivalent time (ET) sampler connected to the transmit reference antenna;
   a receive antenna;
   a receive equivalent time (ET) sampler connected to the receive antenna;
   pulse detectors responsive to the transmit reference ET sampler and the receive ET sampler outputs;
   a first gate pulse generator connected to a first pulse detector to gate off the first pulse detector after a defined delay interval following pulse detection;
   a second gate pulse detector connected to a second pulse detector to enable the second pulse detector after a defined delay interval following pulse detection from the first pulse detector;
   circuitry responsive to the pulse detectors to produce an output indicating target range.

2. The apparatus of claim 1 wherein the pulse detectors comprise automatic threshold pulse detectors.

3. The apparatus of claim 2 where the automatic threshold pulse detectors detect envelope detected signals.

4. The apparatus of claim 3 where the automatic threshold pulse detectors detect the phase of bipolar, sinusoidal equivalent time burst signals.

5. The apparatus of claim 2 further comprising a gate pulse generator which gates off at least one of the automatic threshold pulse detectors after a defined delay interval following pulse detection.

6. The apparatus of claim 2 further comprising a first gate pulse generator connected to a first pulse detector to gate off the first pulse detector after a defined delay interval following pulse detection, and a second gate pulse generator connected to a second pulse detector to enable the second pulse detector after a defined delay interval following pulse detection from the first pulse detector.

7. The apparatus of claim 1 where the output is a pulse width modulated PWM signal with a width proportional to target range.

8. The apparatus of claim 1 where the receive antenna is isolated from the transmit antenna.

9. The apparatus of claim 1 further comprising a first antenna horn containing the transmitter antenna, transmitter, transmit reference antenna, and transmit reference ET sampler, and a second antenna horn containing the receive antenna and receive sampler.

10. The apparatus of claim 1 further comprising:
    a receive clock connected to both the transmit reference ET sampler and the receive ET sampler.

11. The apparatus of claim 10 further comprising a transmit horn in which the transmit antenna, transmitter, transmit reference antenna and transmit reference ET sampler are all collocated.

12. The apparatus of claim 1 further comprising:
    a first clock connected to the transmitter;
    a second clock connected to the transmit reference ET sampler.

13. The apparatus of claim 12 further comprising a transmit horn in which the transmit antenna, transmitter, transmit reference antenna and transmit reference ET sampler are all collocated.

14. A precision pulse-echo ranging apparatus comprising:
    a transmit antenna;
    a transmitter connected to the transmit antenna;
    a transmit reference antenna collocated with the transmit antenna;
    a transmit reference sampler connected to the transmit reference antenna;
    a receive antenna;
    a receive sampler connected to the receive antenna;
    a transmit clock connected to the transmitter;
    a receive clock connected to both the transmit reference sampler and the receive sampler;
    a first envelope detector connected to the transmit reference sampler;
    a second envelope detector connected to the receive sampler;
    a first automatic threshold pulse detector connected to the first envelope detector;
    a second automatic threshold pulse detector connected to the second envelope detector;
    logic circuitry connected to the first and second automatic threshold pulse detectors.

15. The apparatus of claim 14 further comprising a timing control unit connected between the transmit clock and the receive clock to provide a swept timing relation between the transmit and receive clocks.

16. A precision pulse-echo ranging apparatus comprising:
    a transmit antenna;
    a transmitter connected to the transmit antenna;
    a transmit reference antenna collocated with the transmit antenna;
    a transmit reference sampler connected to the transmit reference antenna;
    a receive antenna;
    a receive sampler connected to the receive antenna;
    a transmit clock connected to the transmitter;
    a receive clock connected to both the transmit reference sampler and the receive sampler;

a first automatic threshold pulse detector connected to the transmit reference sampler;

a second automatic threshold pulse detector connected to the receive sampler;

logic circuitry connected to the first and second automatic threshold pulse detectors.

17. The apparatus of claim 16 further comprising a timing control unit connected between the transmit clock and the receive clock to provide a swept timing relation between the transmit and receive clocks.

18. A method for detecting the phase of a sinusoidal burst in a sequence of bursts, comprising:

detecting a peak voltage of a first sinusoidal burst;

holding the detected peak voltage from the first sinusoidal burst until a second sinusoidal burst occurs;

multiplying the detected peak voltage by a fraction $\alpha<1.0$ to produce a threshold voltage that falls between two lobes of the second sinusoidal burst;

comparing the threshold voltage and the second sinusoidal burst to produce a detection pulse from a selected sinusoidal lobe.

19. The method of claim 18 further comprising gating off the peak detecting after a defined delay after producing the detection pulse.

20. The method of claim 18 further comprising enabling the peak voltage detecting after a defined delay from a prior pulse detection.

21. The method of claim 18 further comprising determining a range indication from the detection pulse.

22. A method for precisely determining radar target range, comprising:

determining an exact time of transmission with a transmit reference equivalent time sampler collocated with a transmit antenna;

determining an exact time of reception with a receive equivalent time sampler;

determining radar range from the difference in transmit reference and receive equivalent times.

23. An apparatus for precisely determining radar target range, comprising:

a means for determining an exact time of transmission with a transmit reference equivalent time sampler collocated with a transmit antenna;

a means for determining an exact time of reception with a receive equivalent time sampler;

a means for determining radar range from the difference in transmit reference and receive equivalent times.

24. The apparatus of claim 23 wherein the transmit reference equivalent time sampler and receive equivalent time sampler are driven from a common receive clock.

25. The apparatus of claim 24 wherein the means for determining times for transmission and reception comprise automatic threshold pulse detectors.

* * * * *